June 12, 1962     D. L. SPOONER     3,039,024
VOLTAGE COMPARATOR
Filed Feb. 26, 1959     2 Sheets-Sheet 1
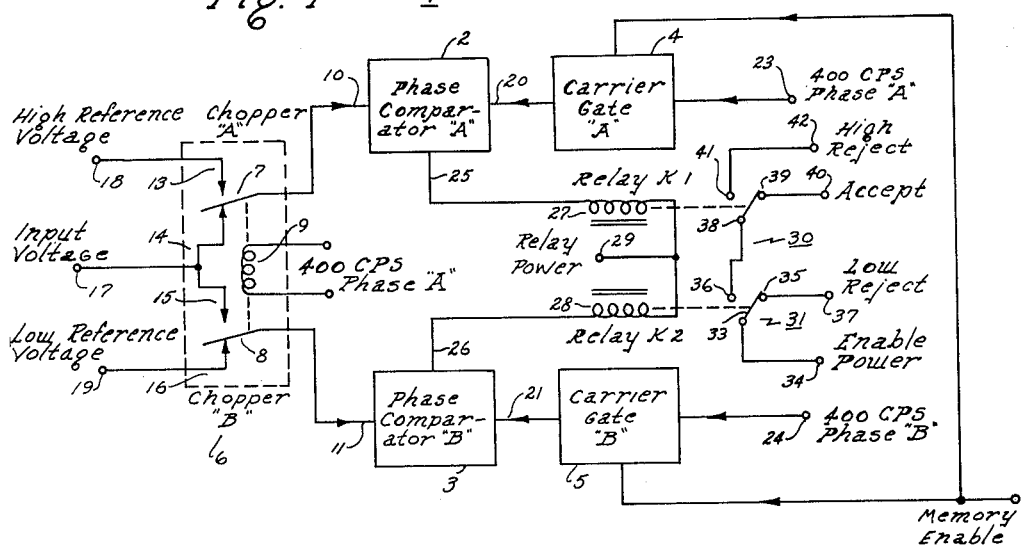
Fig. 1
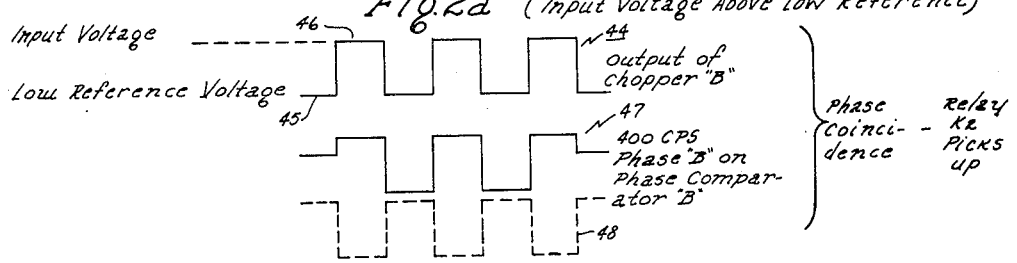
Fig. 2a (Input Voltage Above Low Reference)
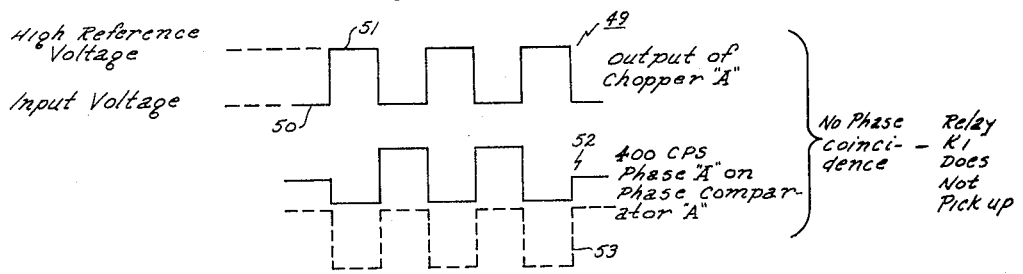
Fig. 2b (Input Voltage Below High Reference)
INVENTOR.
David L. Spooner
BY *Just & Irish*
Attorneys INVENTOR.
David L. Spooner
BY Just & Irish
Attorneys

United States Patent Office 3,039,024
Patented June 12, 1962

1

3,039,024
VOLTAGE COMPARATOR
David L. Spooner, Clark's Green, Pa., assignor to International Telephone and Telegraph Corporation
Filed Feb. 26, 1959, Ser. No. 795,824
15 Claims. (Cl. 317—149)

This invention relates to voltage comparator devices for comparing a voltage of unknown magnitude with a reference voltage and providing an indication of whether the unknown voltage bears a predetermined magnitude relation, i.e., either above or below the reference voltage, and more particularly to a voltage comparator for providing an indication that the voltage of an unknown magnitude is within or respectively below or above lower and upper reference voltages, and which is further capable of so evaluating not only direct current voltages, but also low frequency alternating current voltages.

Much of the testing of complex electronic apparatus involves the determination of whether the voltage at a particular point in the circuit being tested is within lower and upper predetermined limits. It is therefore desirable in the design of testing equipment for such complex electronic apparatus to provide a voltage comparator device which will not only automatically provide an indication as to whether the voltage at a particular point is within the desired limits, but also to provide an indication as to whether the test voltage is below or above the lower or upper limits respectively. Furthermore, while the bulk of the voltages being evaluated in such apparatus are direct current potentials, as opposed to alternating current voltages of commercial or higher frequencies, there are numerous occasions when it is desirable to evaluate with the same equipment voltages varying from a frequency of 0, i.e., direct current, to a low frequency alternating current, i.e., for example, ten (10) cycles per second.

It is therefore desirable to provide in a single unit a voltage comparator circuit capable of evaluating direct current signals with high accuracy, and further of evaluating low frequency alternating current signals, to the same accuracy. It is further desirable that such a circuit be relatively simple and involve a minimum number of components. While direct current voltage comparator circuits providing an "accept-reject" indication have been proposed, insofar as the present applicant is aware, such prior circuits have been characterized by their relative complexity and lack of the requisite accuracy, and further, no single voltage comparator circuit known to the present applicant has been capable of evaluating both direct current signals and low frequency alternating current signals.

In accordance with the broader aspects of my invention therefore, I have provided a voltage comparator circuit comprising phase comparison means with a first input circuit adapted to be coupled to a source of input voltage to be evaluated and a second input circuit adapted to be coupled to a reference voltage source. Means are provided for alternately coupling the first and second input circuits to the phase comparison means at a predetermined frequency and a source of periodically varying voltage of the same predetermined frequency is also coupled to the phase comparison means. Means are further coupled to the phase comparison means for providing an indication of a predetermined phase relationship of the voltages coupled thereto, thereby indicating whether the input voltage bears a predetermined magnitude in relation to the reference voltage. In accordance with a further aspect of my invention, means are provided for disabling the phase comparison means responsive to an indication provided by the indicating means so that low frequency alternating current input voltages may be evaluated.

2

It is accordingly an object of my invention to provide an improved voltage comparator.

Another object of my invention is to provide an improved voltage comparator capable of evaluating a voltage of unknown magnitude against lower and upper reference voltages and providing an indication as to whether the unknown voltage is within or respectively below or above the reference voltages, such comparator incorporating simpler circuitry and providing higher accuracy than prior circuits known to the present applicant.

It is a further object of my invention to provide a voltage comparator capable of evaluating and providing an "accept-reject" indication of both direct current voltages and low frequency alternating current voltages.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 schematically illustrates my improved voltage comparator circuit;

FIGS. 2a and 2b illustrate the mode of operation of my circuit; and

Figure 3:
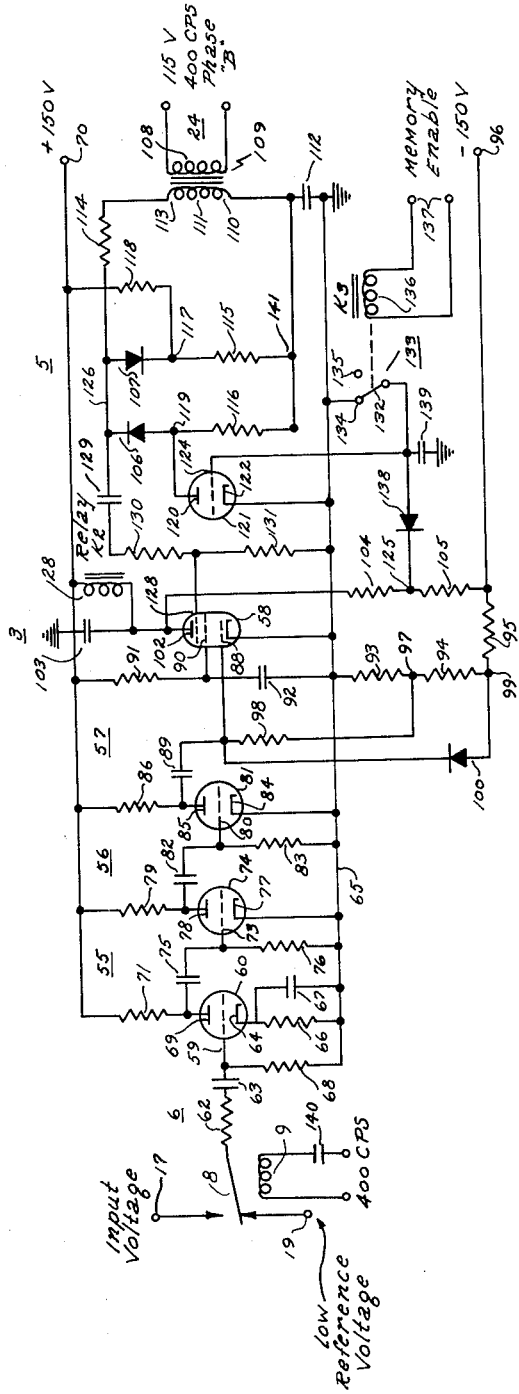
FIG. 3 is a schematic illustration showing the circuitry of one channel of my improved voltage comparator system of FIG. 1.

Referring now to FIG. 1 of the drawing, my improved voltage comparator circuit, generally identified as 1, consists of two identical signal channels "A" and "B," each channel consisting of a phase comparator 2 and 3 and a carrier gate circuit 4 and 5. A double pole-double throw chopper 6 is used to provide each of the phase comparators 2 and 3 with a square wave input, the phase of which is dependent upon the relative magnitudes of the input voltage with respect to lower and upper reference voltages. Alternating current sources having the same frequency as that at which the chopper 6 is operated are also coupled to the phase comparators 2 and 3 by the carrier gate circuits 4 and 5. The outputs of phase comparators 2 and 3 are coupled to the operating coils of relays K1 and K2 which in turn have their contacts connected to energize an indication circuit. In the specific embodiment to be described, the chopper 6 is so connected and the alternating current sources coupled to the phase comparators 2 and 3 are so phased that phase coincidence is provided in the respective phase comparators 2 and 3 when the input voltage is respectively above the low and high reference voltages. The contacts of the relays K1 and K2 are also so connected that picking up of the relay K2 responsive to phase coincidence of its square wave input and its alternating current source and the failure of relay K1 to pick up indicating a lack of coincidence between the square wave input of phase comparator 2 and its respective alternating current source results in an "accept" indication, thus indicating that the input voltage is between the low and high reference voltages.

More particularly, the chopper 6 comprises a pair of double throw switches 7 and 8 synchronously driven by coil 9 adapted to be connected across a suitable source of alternating current power by the use of a suitable series capacitor 140. The value of reactance of this capacitor is chosen to be equal to the inductive reactance of the chopper coil 9. With this combination of reactances, the coil current (and thus the switch action) is in phase with the driving alternating potential. In the example in question this alternating potential is supplied by one phase, identified as phase "A," of a two phase source of four hundred (400) cycle alternating current. Switches 7 and 8 are respectively coupled to one of the phase input circuits 10 and 11 of the phase comparators 2 and 3 with any necessary amplification stages being interposed therebetween.

The switches 7 and 8 are respectively provided with pairs of contacts 13 and 14, and 15 and 16, the contacts 14 and 15 being connected to input terminal 17 which in turn is adapted to be connected to the input voltage to be evaluated. The other contacts 13 and 16 of the chopper switches 7 and 8 are respectively connected to input terminals 18 and 19 adapted respectively to be connected to appropriate high and low reference voltage sources (not shown).

The other input circuits 20 and 21 of the phase comparators 2 and 3 are respectively coupled to sources 23 and 24 of alternating current having the same frequency and source as that employed to energize operating coil 9 of the chopper 6, i.e., in this case four hundred (400) cycles per second. Furthermore, in the preferred embodiment of my invention, the sources 23 and 24 are respectively the two phases of a two-phase source of four hundred (400) cycles per second alternating current, i.e., respectively 180° out of phase and identified here as phases "A" and "B." The carrier gate circuits 4 and 5 are respectively coupled between the input circuits 20 and 21 of phase comparators 2 and 3 and the alternating current sources 23 and 24 serving both to clip the normally sinusoidal signal of the sources 23 and 24 so as to impress second essentially square waves upon the phase comparators 2 and 3, and also as short-term memory or gate circuits which allow the comparator to evaluate during an entire cycle of the input voltage rather than making an instantaneous evaluation, as will be hereinafter more fully described.

The output circuits 25 and 26 of phase comparators 2 and 3 respectively having operating coils 27 and 28 of relays K1 and K2 connected in series therewith and with a source 29 of suitable potential. As will be hereinafter more fully described, phase coincidence in phase comparator 2 of the square wave signals impressed on its input circuits 10 and 20 will result in an output signal in its output circuit 25 which will energize operating coil 27 of relay K1 thereby to pick up its contacts 30. Likewise, phase coincidence of the square wave signals impressed on input circuits 11 and 21 of phase comparator 3 will result in an output signal in its output circuit 26 which will energize operating coil 28 of relay K2 resulting in picking up of its associated contacts 31.

Contacts 31 of relay K2 include a double-throw switch element 33 connected to a suitable source 34 of indicating circuit power and having a first "dropped-out" position 35 and a second "picked-up" position 36. The "dropped-out" position 35 of switch element 33 of contacts 31 of relay K2 is connected to a terminal 37 adapted to be connected to provide a "low reject" indication. "Picked-up" position 36 of switch element 33 of contacts 31 is connected to switch element 38 of contacts 30 of relay K1. Switch element 31 as a "dropped-out" position 39 connected to output terminal 40 to provide an "accept" indication and a "picked-up" position 41 connected to output terminal 42 to provide a "high reject" indication, as will be hereinafter more fully described.

Turning now to FIG. 2a, there is shown the phase relationships of the respective square wave inputs to the phase comparator 3 for an input voltage applied to the input terminal 17 above the low reference voltage applied to the input terminal 19. Here, with the input voltage higher than the low reference voltage, it will be seen that switch element 8 of chopper 6 will alternately connect the low reference voltage source 19 and the input voltage source 17 to the input circuit 11 of phase comparator 3 resulting in square wave form 44 of FIG. 2a, the square waveform 44 comprising alternate low voltage pulses 45 responsive to the low voltage reference source 19 and high voltage pulses 46 responsive to the input voltage 17, the frequency of the square wave signal 44 being that of the voltage impressed upon the operating coil 9 of chopper 6, i.e., four hundred (400) cycles per second in the present instance. Under these conditions, the phase of the alternating current source 24 coupled to the phase comparator 3 by means of carrier gate circuit 5 is suitably chosen so that with the input voltage 17 above the low reference voltage 19, as illustrated in FIG. 2a, the clipped square wave signal 47 applied to the input circuit 21 of phase comparator 3 by the carrier gate circuit 5 is in phase with the square wave signal 44 from the chopper 6 impressed on the input circuit 11 of phase comparator 3. Thus, with the square wave signals 44 and 47 impressed respectively on the input circuits 11 and 21 of phase comparator 3, an output signal is provided in its output signal circuit 26 thus energizing operating coil 28 of relay K2 thereby to move switch element 33 of contacts 31 from its "dropped-out" position 35 to its "picked-up" position 36. It will be readily understood that had the input voltage 17 in fact been below the reference voltage 19, the phase of the square wave signal 44 would have been reversed, as shown in dashed lines at 48, and thus no phase coincidence would have been provided between the square wave input signals 44 and 47 impressed on the phase comparator 3. Thus, no output signal would have been provided in output circuit 26 of phase comparator 3 so that the relay K2 would not have "picked-up" thus leaving its switch element 33 in its "dropped-out" position 35, thereby energizing the "low reject" circuit 37.

Turning now to FIG. 2b, there is shown phase relationships in phase comparator 2 when the input voltage 17 is below the high reference voltage 18. Here, under these conditions, the switch element 7 of chopper 6 will impress a square wave voltage 49 on input circuit 10 of phase comparator 2; it will be seen that the square wave 49 comprises alternate low pulses 50 responsive to the input voltage 17 and high pulses 51 responsive to the high reference voltage 18. It will be observed, by comparison of FIGS. 2a and 2b that with the chopper 6 operating synchronously, switch element 8 is connected to the low reference voltage source 19 simultaneously with connection of switch element 7 to the input voltage source 17. It will thus be observed that the low reference voltage pulses 45 of FIG. 2a occur in time coincidence with the input voltage pulse 50 of FIG. 2b and likewise that the high input voltage pulses 46 of FIG. 2a appear in time coincidence with the high reference voltage pulse 51 of FIG. 2b. It will thus be seen that for the particular condition here under consideration, i.e., with the input voltage above the low reference voltage 19 and below the high reference voltage 18, the square wave signals 44 and 49 impressed respectively on phase comparators 3 and 2 are in phase. However, it will be observed that the clipped four hundred (400) cycle signal 52 impressed on the other input circuit 20 of phase comparator 2 from the source 23 is 180° out of phase from the clipped signal 47 impressed on input circuit 21 of phase comparator 3 and thus is out of phase with the square wave input signal 49 under the circumstances here under discussion. Thus, with the input voltage 17 below the high reference voltage 18, the square wave signals 49 and 52 impressed respectively on input circuits 10 and 20 of phase comparator 2 are out of phase and therefore there will be no output signal provided in the output circuit 25 of phase comparator 2 and thus operating coil 27 of relay K1 will not be energized. Relay K1 will thus, under the present conditions, not be picked-up and switch element 38 of its contacts 30 will remain in its "dropped-out" position. It is thus seen that with the input voltage 17 above the low reference voltage 19, relay K2 will pick up, however, with the input voltage 17 below the high reference voltage 18, relay K1 will remain dropped-out and thus, terminal 34 will be directly connected to the output terminal 40 by means of switch element 33 of relay K2 in its "picked-up" positions 36, and switch element 38 of contacts 30 of relay K1 in its "dropped-out" position 39, thus energizing the "accept" indication circuit, in turn indicating that the input voltage is between the low and high reference voltage limits 19 and 18, respectively.

It will be readily seen that had the input voltage 17 been above the high reference voltage 18, the phase of the square wave input signal 49 impressed on input circuit 10 of phase comparator 2 would have been reversed, i.e., as shown in the dashed lines 53. Under these conditions, the square wave signal 49 would have been in phase with the clipped square wave input signal 52 of the phase comparator 2, thus providing an output signal in the output circuit 25 and energizing the operating coil 27 of relay K1. Thus, switch element 38 of contacts 30 would have been picked up and since relay K2 would, under these conditions, also be picked up so that its switch element 33 is in its picked up position 36, it will be seen that the terminal 34 will be directly connected to the high "reject" output terminal 42, thus providing a high "reject" indication, showing that the input voltage 17 is above both the low reference voltage 19 and the high reference voltage 18.

Referring now to FIG. 3, the preferred circuitry of one of the channels of my improved comparator of FIG. 1 is shown, in this instance channel "B" comprising phase comparator 3 and the carrier gate circuit 5. Here, the signal from switch element 8 of chopper 6 is passed through three amplifier stages 55, 56 and 57 to the phase comparator 3 which here takes the form of a pentode tube 58 connected in a phase detector of phase coincidence circuit. More specifically, switch element 8 of chopper 6 is connected to the control grid 59 of tube 60 of amplifier 55 by means of a suitable resistor 62 and coupling capacitor 63. Cathode 64 of tube 60, shown here as a triode, is connected to ground 65 by means of cathode resistor 66 and a parallel capacitor 67. Grid 59 of tube 60 is likewise connected to ground by grid resistor 68 and the plate 69 of tube 60 is connected to a suitable source 70 of positive plate potential, such as +150 volts by means of plate resistor 71.

Plate 69 of amplifier tube 60 of amplifier 55 is coupled to grid 73 of tube 74, shown here as being a triode, of the second amplifier stage 56 by means of a suitable coupling capacitor 75, grid 73 being connected to ground 65 by grid resistor 76 and cathode 77 being likewise directly connected to ground as shown. Plate 78 of triode 74 is likewise connected to the positive source of plate potential 70 by a suitable plate resistor 79.

Plate 78 of amplifier tube 74 of amplifier 56 is likewise coupled to grid 80 of triode 81 of the third amplifier stage 57 by means of a coupling capacitor 82, the grid 80 of triode 81 being connected to ground 65 by means of a grid resistor 83, and cathode 84 being directly connected to ground 65 as shown. Plate 85 of amplifier tube 81 of the third amplifying stage 57 is likewise connected to the positive source 70 of plate potential by plate resistor 86.

Plate 85 of amplifier tube 81 of the third amplifier stage 57 is coupled to the control grid 88 of pentode 58 of phase comparator 3 by means of coupling capacitor 89. The screen grid 90 of pentode 58 is connected to the positive source of plate potential 70 by means of a suitable resistor 91 and to ground 65 by capacitor 92. A voltage divider comprising resistors 93, 94 and 95 is serially connected between ground 65 and a suitable source 96 of negative potential, such as −150 volts. Control grid 88 of pentode 58 is connected to a point 97 between voltage divider resistors 93 and 94 by a suitable resistor 98 and control grid 88 of pentode 58 is likewise connected to point 99 between voltage divider resistors 94 and 95 by a suitable diode 100, polarized as shown.

The plate 102 of the phase detecting pentode 58 of phase comparator 3 is connected to the positive source of plate potential 70 by means of operating coil 28 of relay K2, holding capacitor 103 being connected to ground as shown. This holding capacitor 103 serves to smooth the current flowing through coil 28 and thus effectively increases the sensitivity of the overall circuit.

Plate 102 of pentode 58 of phase comparator 3 is connected to the negative source of potential 96 by means of voltage divider comprising resistors 104 and 105. Clipping of the four hundred (400) cycle phase "B" alternating current source 24 is accomplished by means of a pair of oppositely polarized diodes 106 and 107. Here, source 24 of the four hundred (400) cycle phase "B" alternating current which may, for example, have an R.M.S. value of 115 volts, is connected to primary winding 108 of transformer 109. One side 110 of secondary winding 111 of transformer 109 is connected to point 141. This point is A.-C. by-passed to ground 65 by means of capacitor 112. The other side 113 of the secondary winding 111 has a resistor 114 serially connected therewith. A suitable resistor 115 serially connects diode 107 across resistor 114 and end 110 of secondary winding 111 of transformer 109 and another suitable resistor 116 likewise serially connects diode 106 in parallel with diode 107 and its serially connected resistor 115 across resistor 114 and end 110 of secondary winding 111 of transformer 109. The midpoint 117 between diode 106 and resistor 115 is connected to the positive source 70 of plate potential by a suitable resistor 118. The midpoint 119 between diode 106 and its respective serially connected resistor 116 is connected to plate 120 of switching tube 121 which in turn has its cathode 122 connected to ground 65 as shown, thus providing a D.C. return path for the diodes 106 and 107. Grid 124 of switching tube 121 is connected to point 125 between voltage dividing resistors 104 and 105 by diode 138 as shown, and is also connected to ground by capacitor 139. Midpoint 126 between diodes 106 and 107 is in turn connected to the suppressor grid 128 of pentode 58 by means of capacitor 129 and resistor 130, suppressor grid 128 also being connected to ground 65 by means of suitable resistor 131.

In accordance with an important feature of my invention, the grid 124 of the switching tube 121 is selectively disconnected from ground 65 by means of switch element 132 of contacts 133 of memory enable relay K3. It will be seen that switch element 132 of relay K3 in its "dropped-out" position 134 connects grid 124 of switching tube 121 to ground 65, this ground connection being broken in "picked-up" position 135 of switch element 132. Operating coil 136 of memory enable relay K3 is connected to terminals 137 which in turn are adapted to be connected to a suitable selectively energized source of power for selectively energizing coil 136 thereby to pick up relay K3 and thus to break the grounded connection of grid 124 of switching tube 121.

The carrier gate 5 (and its counterpart 4 in the phase comparator channel "A") is used for a zero-to-peak evaluation of low frequency input signals. As an input sinusoidal waveform reaches its peak value, and assuming that it is above the low reference 19 and below the high reference 18, relay K2 will be energized and thus "picked-up" and relay K1 will remain deenergized and thus "dropped-out." The carrier gates 4 and 5 are respectively employed to remove the four hundred (400) cycles per second carrier from the respective phase comparators 2 and 3 when a respective output relay K1 or K2 has been energized. The respective phase comparator 2 or 3 then loses control and the output relay K1 or K2 which has been picked up remains energized. The switching tube 121 (and its counterpart in channel "A") are used to gate-off the clipped four hundred (400) cycles per second carrier. This is accomplished when the plate current in triode 121 is cut-off as a result of both relay K2 and K3 being energized. The phase comparator 3 then loses control of relay K2 because of loss of suppressor grid signal, and relay K2 remains energized until the end of the test step when the "memory enable" potential is removed from relay K3.

More particularly, each channel "A" and "B" of comparator 1 functions as a normal direct current voltage comparator so long as relay K3 is not "picked-up" so that grid 124 of switching tube 121 is directly connected to ground 65. However, when relay K3 is energized by the application of a "memory enable" signal across terminals 137, switching contact 132 picks up thereby breaking the direct connection of grid 124 of switching tube 121 to ground. Merely breaking this connection produces no immediate result since point 125 and voltage divider 104—105 will remain essentially at ground. However, when sufficient plate current is drawn by pentode 58 responsive to phase coincidence of square wave signals 44 and 47 to energize operating coil relay 28 of relay K2, the potential of plate 102 drops sufficiently that the potential of point 125 on voltage divider 104—105 likewise drops sufficiently to lower the potential of grid 124 of switching tube 121 so as to cut-off switching tube 121. This negative potential is held on grid 124 by virtue of the negative charge on the capacitor 139 and the blocking action of diode 138. The cut-off of tube 121 removes the direct current bias, relative to point 141, from diodes 106 and 107, and thus decouples the four hundred (400) cycle carrier (more specifically reducing the amplitude of the clipped square wave 47 to an ineffective value) from suppressor grid 128 of pentode 58. The control of the coincidence tube 58 is now turned over to control grid 88.

Considering first a low frequency alternating current input signal having a peak value above the low reference voltage 19 and below the high reference voltage 18, the signal voltage level of such a signal produces a "reject" indication until it reaches the low reference voltage level 19, at which time the relay K2 will pick-up, and as described above, remain energized so long as relay K3 is also energized. Picking-up of relay K2 will provide an "accept" indication so long as relay K1 is not picked-up; under this condition, relay K1 will not pick up since the remaining portion of the indicated sine wave does not reach the high reference voltage level 18. Considering now a low frequency alternating current input signal having a peak value less than the low reference voltage 19, since the signal voltage level will never reach even the low reference voltage level 19, neither relay K2 nor K1 will pick up and thus the low "reject" circuit 37 will remain energized. Considering lastly a low frequency alternating current input signal having a peak value higher than the high reference voltage level 18, the signal voltage level will first produce a low "reject" indication until it reaches the low reference level 19, at which time relay K2 will pick-up, latching in an "accept" condition. As the signal level of such a signal continues to the high reference level 18, relay K1 will pick up and latch in (so long as relay K3 in channel "A" remains energized) thus in turn providing a high "reject" indication.

It will be readily understood that other contact arrangements of the relays K1 and K2 may be employed and that with such modified contact arrangements, the four hundred (400) cycle carrier supplied to the phase comparators 2 and 3 may respectively be in phase rather than 180° out of phase. Thus, assuming that the clipped four hundred (400) cycle carriers 47 and 52 are in phase, rather than 180° out of phase as shown, with the conditions shown in FIGS. 2a and 2b, i.e., with the input voltage 17 above the low reference voltage 19 and below the high reference voltage 18, both relays K2 and K1 would pick up by virtue of the phase coincidence of the in-phase carriers 47 and 52 with the square wave input signals 44 and 49. It will be readily understood, however, that appropriate modification of the contacts 30 and 31 associated with relays K1 and K2 will provide an "accept" indication under these conditions, with appropriate low "reject" and high "reject" indications likewise being provided by appropriate contact arrangements.

In an actual comparator circuit constructed in accordance with FIG. 3, the components of each comparator channel had the following values:

| Component | Value |
|---|---|
| Tube 58 | 6AS6. |
| Tube 60 | 1/2–12AX7. |
| Resistor 62 | 56,000 ohms. |
| Capacitor 63 | .002 mfd. |
| Resistor 66 | 10,000 ohms. |
| Capacitor 67 | 25 mmfd. |
| Resistor 71 | 56,000 ohms. |
| Tube 74 | 1/2–12AX7. |
| Capacitor 75 | .033 mfd. |
| Resistor 76 | 1 megohm. |
| Resistor 79 | 560,000 ohms. |
| Tube 81 | 1/2–12AX7. |
| Capacitor 82 | .033 mfd. |
| Resistor 83 | 1 megohm. |
| Resistor 86 | 560,000 ohms. |
| Capacitor 89 | .033 mfd. |
| Resistor 91 | 10,000 ohms. |
| Capacitor 92 | 2.0 mfd. |
| Resistor 93 | 4,500 ohms. |
| Resistor 94 | 4,500 ohms. |
| Resistor 95 | 121,000 ohms. |
| Resistor 98 | 1 megohm. |
| Diode 100 | HD6002. |
| Capacitor 103 | 2 mfd. |
| Resistor 104 | 909,000 ohms. |
| Resistor 105 | 1 megohm. |
| Diodes 106–107 | HD-6002. |
| Transformer 109 | 1-to-1 turn ratio. |
| Capacitor 112 | .01 mfd. |
| Resistor 114 | 2.2 megohms. |
| Resistor 115 | 22,000 ohms. |
| Resistor 116 | 22,000 ohms. |
| Resistor 118 | 56,000 ohms. |
| Tube 121 | 12AY7. |
| Capacitor 129 | .033 mfd. |
| Resistor 130 | 1 megohm. |
| Resistor 131 | 2.2 megohms. |
| Diode 138 | HD-6001. |
| Capacitor 139 | .0068 mfd. |

It will now be seen that I have provided an extremely simple voltage comparator capable not only of evaluating direct current voltage and providing "accept," low "reject" and high "reject" indications, but also of evaluating low frequency alterating current voltages up to on the order of ten (10) cycles per second. I have found that the resolution of this comparator is less than one (1) millivolt, and the operaional accuracy of the unit is limited only by the four hundred (400) cycle per second noise at the input grids of the first amplifier stage 55 and the random noise on the signal and reference inputs. Thus, if the reference and signal inputs are well filtered and good shielding practices are used, a system measurement accuracy of two (2) millivolts can be obtained.

While I have described above the principles of my invention in connection with specific apparatus, it is to be clearly understood that this description is made only by way of example and not as a limitation to the scope of my invention.

What is claimed is:

1. A voltage comparator comprising: a phase comparator circuit including a tube having a plate, a cathode and at least two grid elements; a first input circuit adapted to be coupled to a source of input voltage to be evaluated; a second input circuit adapted to be coupled to a direct current reference voltage source; a chopper for alternately coupling said first and second input circuits to one of said tube grids at a predetermined frequency whereby a first square wave signal having said predetermined frequency with its phase dependent upon the relative magnitudes of said input voltage and reference voltage is fed to said one grid; a source of alternating current voltage of said predetermined frequency and having a predetermined phase; clipping means coupling said alternating current voltage source to the other grid of said tube thereby to feed a second essentially square wave thereto; a source of energizing voltage, and a relay having its operating coil coupled to said source of energizing voltage and to said plate and arranged to pick up responsive to phase coincidence of said first and second square waves in said tube thereby to provide an indication when said input voltage bears a predetermined magnitude relation to said reference voltage.

2. The combination of claim 1 in which said clipping means includes a pair of oppositely polarized diodes each serially connected with a resistor across said source of alternating current voltage.

3. A voltage comparator comprising: a phase comparator circuit including a tube having a plate, a cathode and at least two grid elements; a first input circuit adapted to be coupled to a source of input voltage to be evaluated; a second input circuit adapted to be coupled to a direct current reference voltage source; a chopper for alternately coupling said first and second input circuits to one of said tube grids at a predetermined frequency whereby a first square wave signal having said predetermined frequency with its phase dependent upon the relative magnitudes of said input voltage and reference voltage is fed to said one grid; a source of alternating current voltage of said predetermined frequency and having a predetermined phase coupled to the other grid of said tube; a pair of diodes, a resistance series connected between the anode of one diode and the cathode of the other diode, the remaining cathode and anode of said diodes being connected together by a common connection, said common connection and a point between the ends of said resistance being series connected across said alternating current voltage source thereby clipping the same to feed a second essentially square wave to said other tube grid; a source of energizing voltage, a relay having its operating coil coupled to said source of energizing voltage and to said tube plate and arranged to pick up responsive to phase coincidence of said first and second square waves on said grids of said tube thereby to provide an indication when said input voltage bears a predetermined magnitude relation to said reference voltage; a source of direct current potential coupled to the junction of one of said diodes and said resistance; a switching tube having its plate coupled to the junction of the other of said diodes and said resistance and its cathode coupled to a source of reference potential; a voltage divider coupling the plate of said comparator tube to another source of direct current potential; said switching tube having its grid coupled to a point on said voltage divider; and switching means having a first position coupling said switching tube grid to said source of reference potential and a second position decoupling said switching tube grid from said source of reference potential whereby flow of plate current in said comparator tube resulting in picking up of said relay cuts-off said switching tube thereby to decouple said alternating current voltage source from said other comparator tube grid and disabling said comparator whereby low frequency alternating current input voltages may be evaluated.

4. The combination of claim 3 further comprising a holding capacitor connected across said relay operating coil whereby said coil remains energized subsequent to disabling of said comparator.

5. A voltage comparator comprising: first and second phase comparison means; a first input circuit adapted to be coupled to a source of input voltage to be evaluated; second and third input circuits adapted to be coupled respectively to lower and upper reference voltage sources; means for synchronously alternately connecting said first and second input circuits to said first phase comparison means and said first and third input circuits to said second phase comparison means at a predetermined frequency; each of said phase comparison means having a source of periodically varying voltage of said predetermined frequency coupled thereto; and means coupled to both of said phase comparison means for providing an indication of predetermined phase relationships of the voltages coupled respectively thereto thereby indicating when said input voltage is between said reference voltages.

6. A voltage comparator comprising: first and second phase comparators each having two input circuits for respectively feeding two alternating current voltages thereto and an output circuit for providing an output signal responsive to phase coincidence of said two voltages; a first input circuit adapted to be coupled to a source of input voltage to be evaluated; second and third input circuits adapted to be coupled respectively to lower and upper reference voltage sources; a synchronous chopper for alternately coupling said first and second input circuits to one of the input circuits of said first comparator and for alternately coupling said first and third input circuits to one of the input circuits of said second comparator at a predetermined frequency whereby square waves having said predetermined frequency with their phases respectively dependent upon the relative magnitudes of said input voltage and said reference voltages are respectively fed to said comparators; the other input circuits of said first and second comparators being respectively coupled to sources of alternating current voltage of said predetermined frequency and predetermined phase; and indicating means coupled to the output circuits of both of said comparators and energized to provide an indication when said input voltage is between said reference voltages responsive to said comparator output signals.

7. The combination of claim 6 in which said sources of alternating current are respectively 180° out of phase.

8. The combination of claim 6 in which said indicating means includes first and second relays with their operating coils respectively coupled to said output circuits of said first and second comparators for energization responsive to said output signals thereof, said first and second relays having contacts respectively coupled in an indicating circuit.

9. A voltage comparator comprising: first and second phase comparator circuits each including a tube having a plate, a cathode and at least two grid elements; a first input circuit adapted to be coupled to a source of input voltage to be evaluated; second and third input circuits adapted to be coupled respectively to lower and upper reference voltage sources; a synchronous chopper for alternately coupling said first and second input circuits to one grid of said first comparator tube and said first and third input circuits to one grid of said second comparator tube at a predetermined frequency with their phases respectively dependent upon the relative magnitudes of said input voltage and said reference voltages are respectively impressed on said one grid of said comparator tubes; first and second sources of alternating current of said predetermined frequency respectively 180° out of phase; first and second clipping circuits respectively coupling said first and second alternating current sources to the other grids of said comparator tubes whereby second essentially square waves are fed thereto; first and second relays respectively having their operating coils connected in series with the plates of said comparator tubes and arranged to pick up respectively responsive to phase coincidence of said first and second square waves on said grids of said comparator tubes; sources of energizing voltage coupled to said relays, said relays respectively having contacts connected in an indication circuit so that picking up of said first relay provides an "accept" indication responsive to said input voltage being above said lower reference voltage and picking up of said second relay provides a "reject" indication responsive to said input voltage being above said upper reference voltage.

10. The combination of claim 9 further comprising: first and second switching tubes having their plates respectively connected to said first and second clipping circuits respectively; the cathodes of said first and second switching tubes connected to ground; the plates of said first and second comparator tubes being respectively connected to a second source of direct current potential by voltage dividers; the grids of said switching tubes being respectively connected to points on said voltage dividers; first and second switching means having first positions respectively connecting said switching tube grids to ground and second positions breaking said connections; and holding capacitors respectively connected across said first and second relay operating coils whereby said switching tubes are respectively driven to cut-off thereby decoupling said alternating current sources from said comparator tubes responsive to picking up of said relays when said switching means are in their second positions whereby low frequency alternating current input voltages may be evaluated.

11. The combination of claim 9 in which the contacts of said first relay when the same is not picked up are connected to energize a "low project" indication circuit thereby indicating that said input voltage is below said lower reference voltage and the contacts of said second relay when picked up are connected to energize a "high reject" indication circuit thereby indicating that said input voltage is above said upper reference voltage, said relay contacts being connected to energize an "accept" indication circuit when said first relay is picked up and said second relay is not picked up thereby indicating that said input voltage is within said lower and upper reference voltages.

12. A voltage comparator comprising: phase comparison means; a first input circuit adapted to be coupled to a source of input voltage to be evaluated; a second input circuit adapted to be coupled to a reference voltage source; means for alternately coupling said first and second input circuits to said phase comparison means at a predetermined frequency to provide an input signal; a source of periodically varying voltage of said predetermined frequency coupled to said phase comparison means; means coupled to said phase comparison means for providing an indication of a predetermined phase relationship of the voltages coupled to said phase comparison means by said alternative coupling means and said periodically varying voltage; and means for decoupling said phase comparison means from said source of periodically varying voltage in response to phase coincidence at said phase comparison means of said source of periodically varying voltage and said input signal.

13. A voltage comparator comprising: a phase comparator having two input circuits for respectively feeding two alternating current voltages thereto and an output circuit for providing an output signal responsive to phase coincidence of said two voltages; a first input circuit adapted to be coupled to a source of input voltage to be evaluated; a second input circuit adapted to be coupled to a direct current reference voltage source; a chopper for alternately coupling said first and second input circuits to one of said phase comparator input circuits at a predetermined frequency whereby a square wave signal having said predetermined frequency with its phase dependent upon the relative magnitudes of said input voltage and reference voltage is fed to said comparator; a source of alternating current voltage of said predetermined frequency and having a predetermined phase coupled to the other input circuit of said comparator; indicating means coupled to said comparator output circuit and energized to provide an indication when said input voltage bears a predetermined magnitude relation to said reference voltage responsive to said comparator output signal; means for decoupling said alternating current source from said comparator in response to phase coincidence of said square wave and said alternating current voltage; and means for maintaining said indicating means energized subsequent to said decoupling of said comparator whereby low frequency alternating current input voltages may be evaluated.

14. The combination of claim 13 further comprising means for clipping said alternating current voltage thereby to feed an essentially square wave signal to said other comparator input circuit.

15. A voltage comparator comprising a phase comparator having two input circuits and an output circuit for providing an output signal in response to phase coincidence of two alternating voltages coupled to said two input circuits respectively, a first source of input voltage, a second source of input voltage, means for alternately applying said first and second input voltages to one of said input circuits at a predetermined frequency for providing an alternating input voltage, a source of alternating voltage of said predetermined frequency coupled to the other of said input circuits, an indicator coupled to said output circuit and operative in response to said output signal produced by said comparator when said alternating input voltage and said alternating voltage coincide in phase, means for decoupling said source of alternating voltage from said other input circuit in response to said output signal, and means for sustaining said output signal after said decoupling occurs.

References Cited in the file of this patent

UNITED STATES PATENTS

| | | |
|---|---|---|
| 2,632,886 | Barney | Mar. 24, 1953 |
| 2,684,479 | Hill et al. | July 20, 1954 |
| 2,806,185 | Oberman | Sept. 10, 1957 |
| 2,822,518 | Jordan | Feb. 4, 1958 |

UNITED STATES PATENT OFFICE

CERTIFICATE OF CORRECTION

Patent No. 3,039,024  June 12, 1962

David L. Spooner

It is hereby certified that error appears in the above numbered patent requiring correction and that the said Letters Patent should read as corrected below.

Column 11, line 25, for '"low project"' read -- "low reject" --.

Signed and sealed this 2nd day of October 1962.

(SEAL)
Attest:

ERNEST W. SWIDER
Attesting Officer

DAVID L. LADD
Commissioner of Patents